United States Patent
Bajwa et al.

(10) Patent No.: US 8,990,032 B2
(45) Date of Patent: Mar. 24, 2015

(54) IN-PAVEMENT WIRELESS VIBRATION SENSOR NODES, NETWORKS AND SYSTEMS

(75) Inventors: Ravneet Bajwa, Kensington, CA (US); Ram Rajagopal, Palo Alto, CA (US); Robert Kavaler, Kensington, CA (US); Pravin Varaiya, Berkeley, CA (US)

(73) Assignee: Sensys Networks, Inc., Berkeley, CA (US)

(*) Notice: Subject to any disclaimer, the term of this patent is extended or adjusted under 35 U.S.C. 154(b) by 978 days.

(21) Appl. No.: 13/092,636

(22) Filed: Apr. 22, 2011

(65) Prior Publication Data
US 2012/0173171 A1 Jul. 5, 2012

Related U.S. Application Data (60) Provisional application No. 61/428,820, filed on Dec. 30, 2010, provisional application No. 61/478,226, filed on Apr. 22, 2011.

(51) Int. Cl.
  *G01F 17/00* (2006.01)
  *G08G 1/015* (2006.01)
  *G01H 11/06* (2006.01)
(52) U.S. Cl.
  CPC ............... *G08G 1/015* (2013.01); *G01H 11/06* (2013.01)
  USPC .......................................................... 702/56
(58) Field of Classification Search
  CPC ........... G08G 1/00; G08G 1/14; G01H 1/003; G01H 1/00; G01M 13/045; G01S 7/282
  See application file for complete search history.

(56) References Cited

U.S. PATENT DOCUMENTS

| | | | |
|---|---|---|---|
| 5,555,036 A | 9/1996 | Harnett et al. | |
| 5,748,108 A | 5/1998 | Sampey et al. | |
| 6,333,701 B1 * | 12/2001 | Mee et al. | 340/907 |
| 6,337,640 B2 | 1/2002 | Lees | |
| 6,342,845 B1 | 1/2002 | Hilliard et al. | |
| 6,345,228 B1 | 2/2002 | Lees | |

(Continued)

FOREIGN PATENT DOCUMENTS

| | | |
|---|---|---|
| CN | 1417756 A | 5/2003 |
| JP | 09-210721 | 8/1997 |

(Continued)

OTHER PUBLICATIONS

"A method for detecting road traffic status", English translation of Chinese Patent Application CN 1417756A, cited above as a foreign patent reference.

(Continued)

*Primary Examiner* — Elia Desta
(74) *Attorney, Agent, or Firm* — Earle Jennings

(57) ABSTRACT

Apparatus and methods are disclosed that may be configured to respond to vibrations in a pavement induced by the travel of a vehicle on the pavement. The apparatus may include vibration sensor nodes embedded in the pavement and systems using the response of the sensor nodes to generate vehicle parameters, weight estimates, pavement deflection estimates and vehicle classifications. From these and other data, traffic ticket, tariff and insurance messages about the vehicle may be generated. Processors and processor-units are disclosed. Delivery mechanisms to configure the processor units and entities controlling and/or benefiting from the deliveries are disclosed.

16 Claims, 7 Drawing Sheets

(56) References Cited

U.S. PATENT DOCUMENTS

| | | | |
|---|---|---|---|
| 6,480,783 B1 | 11/2002 | Myr | |
| 6,483,443 B1 | 11/2002 | Lees | |
| 6,587,778 B2 | 7/2003 | Stallard et al. | |
| 6,615,130 B2 | 9/2003 | Myr | |
| 6,671,525 B2 | 12/2003 | Allen et al. | |
| 6,785,606 B2 | 8/2004 | DeKock et al. | |
| 6,804,503 B2 | 10/2004 | Shohara et al. | |
| 6,826,607 B1 | 11/2004 | Gelvin et al. | |
| 7,046,166 B2 | 5/2006 | Pedyash et al. | |
| 7,221,686 B1 | 5/2007 | Belcea | |
| 7,321,317 B2 * | 1/2008 | Nath et al. | 340/933 |
| 7,324,559 B2 | 1/2008 | McGlibney | |
| 7,388,517 B2 | 6/2008 | Kavaler | |
| 7,440,842 B1 | 10/2008 | Vorona | |
| 7,529,217 B2 | 5/2009 | Pister et al. | |
| 7,694,579 B2 * | 4/2010 | Tonelli et al. | 73/803 |
| 7,797,367 B1 | 9/2010 | Gelvin et al. | |
| 7,860,639 B2 | 12/2010 | Yang et al. | |
| 7,881,239 B2 | 2/2011 | Pister et al. | |
| 7,983,835 B2 | 7/2011 | Lagassey | |
| 8,059,629 B1 | 11/2011 | Pister et al. | |
| 8,494,790 B2 * | 7/2013 | Zhu et al. | 702/56 |
| 2002/0116118 A1 | 8/2002 | Stallard et al. | |
| 2002/0145541 A1 | 10/2002 | Matsui et al. | |
| 2002/0177942 A1 | 11/2002 | Knaian et al. | |
| 2005/0213612 A1 | 9/2005 | Pister et al. | |
| 2006/0029061 A1 | 2/2006 | Pister et al. | |
| 2006/0097894 A1 | 5/2006 | Kavaler | |
| 2006/0132298 A1 | 6/2006 | Kavaler | |
| 2007/0050240 A1 | 3/2007 | Belani et al. | |
| 2008/0238720 A1 | 10/2008 | Lee | |
| 2008/0287144 A1 | 11/2008 | Sabata et al. | |
| 2010/0017103 A1 | 1/2010 | Kwong et al. | |
| 2010/0073154 A1 | 3/2010 | Kim et al. | |

FOREIGN PATENT DOCUMENTS

| | | |
|---|---|---|
| JP | 2002-298206 | 10/2002 |
| JP | 2007-188340 | 6/2007 |

OTHER PUBLICATIONS

"Real-time Freeway Level of Service using Inductive-Signature-Based Vehicle Reidentification System" IEEE Transactions on Intelligent Transportation Systems, IEEE, Piscataway, NJ, USA, vol. 6, No. 2, Jun. 1, 2005, pp. 138-146, XPO11133318, ISSN 1524-9050.

* cited by examiner

IN-PAVEMENT WIRELESS VIBRATION SENSOR NODES, NETWORKS AND SYSTEMS

CROSS REFERENCE TO RELATED PATENT APPLICATIONS

This application claims priority to Provisional Patent Application No. 61/478,226 filed Apr. 22, 2011, entitled "In-Pavement Wireless Vibration Sensor Nodes, Networks and Systems", and to Provisional Patent Application No. 61/428,820 filed Dec. 30, 2010 entitled "In-pavement Accelerometer-Based Wireless Sensor Nodes, Networks and Systems and/or Emulating Increased Sample Frequency in a Wireless Sensor Node and/or a Wireless Sensor Network", both of which are incorporated herein in their entirety.

TECHNICAL FIELD

This invention relates to systems that use a wireless sensor network including vibration sensor nodes embedded in pavement. The invention also relates to systems that use vibration readings to generate vehicle parameters that may be used to generate a vehicle classification. The system may also monitor the weight of vehicles and/or their deflection of the pavement while passing over, or near, the sensor node to assess the pavement damage, notify traffic enforcement of traffic violations, tariff fees and/or insurance companies of vehicles they have insured.

BACKGROUND OF THE INVENTION

Vehicles are typically classified into different categories, such as passenger vehicles, buses and trucks of different sizes. Transportation agencies collect vehicle classifications to plan highway maintenance programs, evaluate highway usage, and optimize the deployment of various resources. There are many classification schemes, but the most common ones use axle counts and the spacing between axles.

Transportation agencies measure the weight of vehicles on roads and bridges in order to monitor the state of their repair, enforce weight limits, and charge vehicles fees based on weight criteria. Some agencies use vehicle weight data to predict damage that can be fixed by preservation, which is more cost-effective than rehabilitation. Today, this information is acquired at vehicle weigh stations. To adequately predict the state of repair requires many more weigh stations, which costs too much.

There are two basic kinds of weigh stations, static and Weigh In Motion (WIM). Static weigh stations employ bending plates, piezoelectric and load cell sensors to estimate the weight of stopped vehicles. They need substantial space along a road for measurement. The stations are expensive to install and staff. Every vehicle to be weighed must be stopped, wasting valuable time. This stoppage tends to create long queues of vehicles stretching past the station, which poses traffic safety hazards. The vehicles merging back into traffic after being weighed can cause accidents also.

WIM stations are replacing static weigh stations. Using the same sensors as static weigh stations, WIM stations estimate axle load while a vehicle is moving at highway speeds. They are also expensive and require frequent calibration as well as concrete pavement installed before and after the station.

Some unstaffed WIM stations use a camera to capture the license number or USDOT ID of any vehicle whose WIM measurements suggest it is overweight. These stations, which are referred to as virtual WIM stations, are also expensive and require frequent calibration.

SUMMARY OF INVENTION

Apparatus and methods are disclosed that may be configured to respond to vibrations in a pavement induced by the travel of a vehicle on the pavement. This summary will start by describing an embedded wireless vibration sensor and how the embedded wireless vibration sensor may be used in a system. The potential component(s) that may be used to make the embedded wireless vibration sensor will be discussed. The embedded wireless vibration sensor can be installed in minutes in any type of pavement (asphalt or concrete). Some of the operational variations will then be mentioned.

The embedded wireless vibration sensor node is embedded in pavement and may include at least one vibration sensor and at least a radio transmitter and often a radio transceiver. The embedded wireless vibration sensor node may be configured to operate as follows: The vibration sensor may respond to the vibrations by generating at least one vibration reading. A vibration report may be generated based upon at least one, and often many, of the vibration readings. The radio transmitter may be configured to send the vibration report. The vibrations of the pavement may be generated based upon the movement of the vehicle and its deflection of the pavement near the embedded wireless vibration sensor node.

The system may use the vibration report to generate at least one vehicle parameter. The vehicle parameter may include a length estimate, an axle count estimate, an axle position estimate vector, an axle spacing vector and/or an axle width estimate. In certain implementations, the vehicle parameter may include each of these components. The vehicle parameters may be used to generate a vehicle classification for the vehicle.

The system may use the vibration report to generate a weight estimate of the vehicle and/or a deflection estimate of the vehicle acting on the pavement. In some implementations, a movement estimate and/or the vehicle parameters may be used to further support generating the weight estimate and/or the deflection estimate.

A vehicle identification may be used with the vehicle classification and the weight estimate and/or the deflection estimate, as well as possibly the vehicle parameters and the movement estimate, to generate a vehicle travel record. The vehicle travel record may also include the vehicle classification, as well as possibly a time stamp.

The vehicle travel record may be used to generate a traffic ticket message, and/or a tariff message, and/or an insurance message, for the vehicle. These messages may include much the same information, but may differ in terms of when they are generated and whom they are sent to. The traffic ticket message may only be generated when the vehicle is breaking a traffic regulation. The tariff message may be sent for all vehicles in certain vehicle classifications and/or exceeding a certain weight threshold and/or a deflection threshold. The insurance message may only be generated for vehicles whose vehicle identifications indicate that an insurance company has agreed to pay for the insurance message about the vehicle.

The embedded wireless vibration sensor node may be built from any of several components, in particular, a vibration sensor module, a wireless vibration sensor, and/or a wireless vibration sensor node.

The vibration sensor module may include at least one vibration sensor configured to respond to the vibrations in the pavement to create at least one vibration reading.

The wireless vibration sensor may include the vibration sensor and a radio transmitter configured to send the vibration report based upon the vibration reading.

The wireless vibration sensor node may be configured for embedding in the pavement and may include the vibration sensor and the radio transmitter and/or transceiver.

The apparatus may further include at least one of the following processors:

A first processor configured to respond to the vibration readings to generate the vibration report.

A second processor configured to respond to the vibration report to generate at least one vehicle parameter.

A third processor configured to respond to the vehicle parameter of the vehicle to generate the vehicle classification.

A fourth processor configured to respond to the vibration report to generate the weight estimate and/or the deflection estimate.

A fifth processor configured to respond to the vehicle classification, a vehicle identification, a vehicle movement estimate, the weight estimate and/or the deflection estimate to generate a vehicle travel record.

And a sixth processor configured to respond to the vehicle travel record to generate the traffic ticket message, the tariff message and/or the insurance message.

An access point may be configured to wirelessly communicate with at least one of the embedded wireless vibration sensor nodes to receive the vibration reports. Various combinations of the second through the sixth processor may be implemented in the access point. In some implementations, the embedded wireless vibration sensor node may implement some of the processors.

These processors individually and/or collectively may be implemented as one or more instances of a processor-unit that may include a finite state machine, a computer coupled to a memory containing a program system, an inferential engine and/or a neural network. The apparatus may further include a computer readable memory, a disk drive and/or a server, each configured to deliver the program system and/or an installation package to the processor-unit to implement at least part of the disclosed method and/or apparatus. These delivery mechanisms may be controlled by an entity directing and/or benefiting from the delivery to the processor-unit, irrespective of where the server may be located, or the computer readable memory or disk drive was written.

The disclosed method may include steps initializing at least one of the disclosed apparatus, and/or operating at least one of the apparatus and/or using at least one of the apparatus to create any combination of the vibration report, the vehicle parameter, the vehicle classification, the vehicle travel record, the traffic ticket message, the tariff message and/or the insurance message. The method may produce any of the vibration report, the vehicle parameter, the vehicle classification, the vehicle travel record, the traffic ticket message, the tariff message and/or the insurance message.

DETAILED DESCRIPTION OF DRAWINGS

This invention relates to systems that use a wireless sensor network including vibration sensor nodes embedded in pavement. The invention also relates to systems that use vibration readings to generate vehicle parameters such as vehicle length, the number, positions and/or spacing of some or all of the axles of the vehicle, which may be used to generate a vehicle classification. The system may also monitor the weight of vehicles passing over or near them on a lane to assess the pavement damage of the lane.

This invention relates to wireless weigh-in-motion or W-WIM systems and their components, in particular, to wireless sensor nodes configured to operate one or more vibration sensors, access points configured to wirelessly communicate with the one or more wireless sensor nodes, and processors configured to use vibration readings of the wireless sensor nodes to generate the vehicle parameters and/or the vehicle classification and/or an estimated weight of the vehicle and/or the deflection of the pavement caused by the passage of the vehicle.

Figure 1:
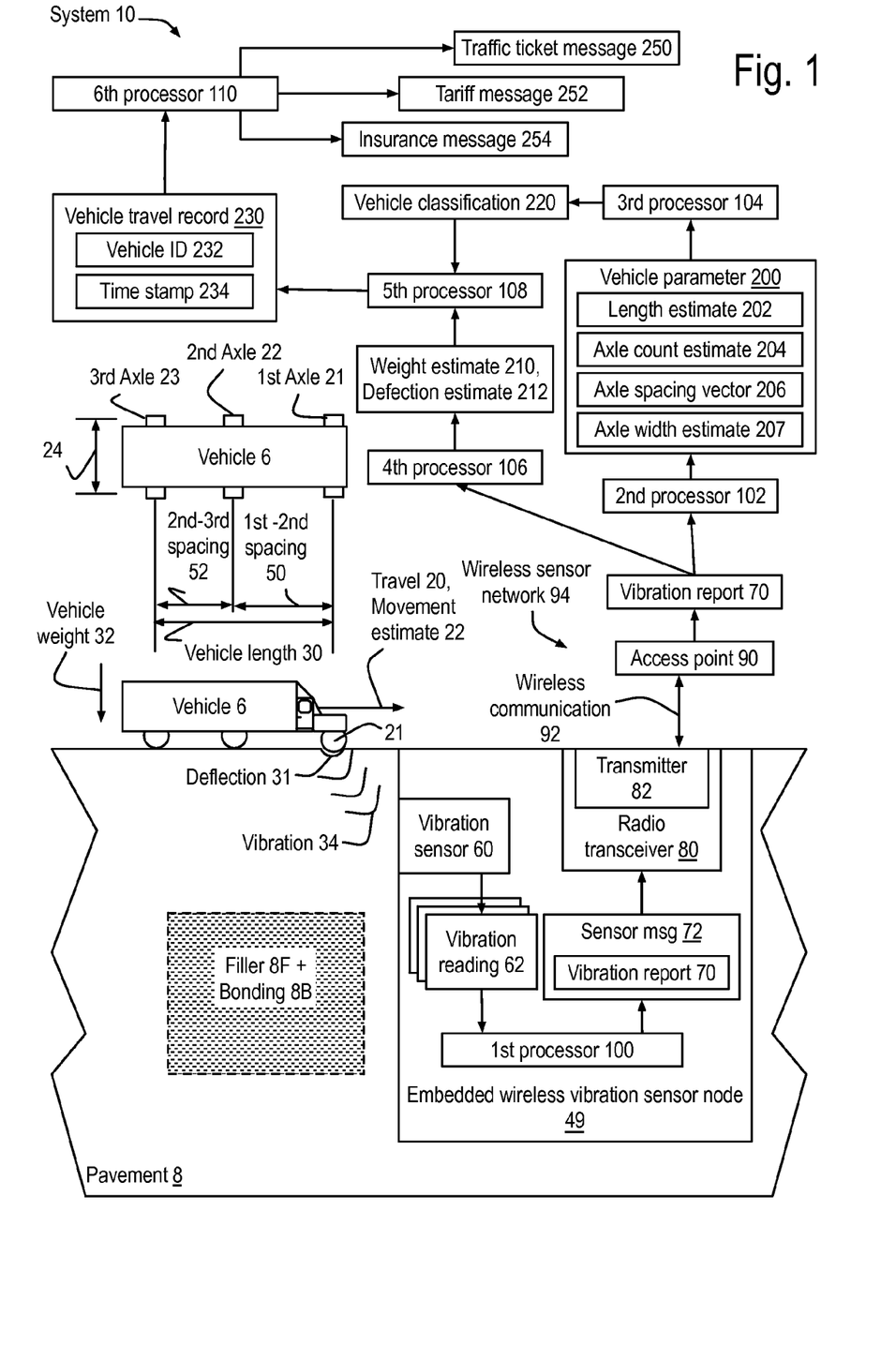
FIG. 1 shows an example system operating and/or using a wireless sensor network that may include at least one access point configured to wirelessly communicate with at least one embedded wireless vibration sensor node embedded in pavement with a vehicle traveling on the pavement inducing vibrations by the deflection of the pavement. The access point receives a vibration report in response to the vibration readings of the vehicle traveling on the pavement. The system may further produce at least one vehicle parameter, a vehicle classification, a vehicle travel record, a traffic ticket message, a tariff message and/or an insurance message.

Referring more specifically to the Figures, FIG. 1 shows an example system 10 that may include at least one wireless sensor network 94. The wireless sensor network 94 may include at least one access point 90 configured to wirelessly communicate 92 with at least one embedded wireless vibration sensor node 49 embedded in pavement 8 with a vehicle 6 traveling 20 on the pavement inducing vibrations 34 in the pavement due to the deflection 31 of the pavement. An access point 90 receives a vibration report 70 via wireless communication 92 from the wireless vibration sensor node 49 in response to the vibrations 34 of the vehicle 6 traveling 20 on the pavement 8.

The pavement 8 may include a filler 8F and a bonding agent 8B. The filler 8F may include sand, gravel and/or pumice. The bonding agent 8B may include asphalt and/or cement.

The embedded wireless vibration sensor node 49 may include at least one vibration sensor 60 and at least a radio transmitter 82 and often a radio transceiver 80 as shown. The embedded wireless vibration sensor node 49 may be configured to operate as follows: The vibration sensor 60 may respond to the vibrations 34 by generating at least one vibration reading 62. The vibration report 70 may be generated based upon at least one and often many vibration readings 62. The radio transmitter 82 may be configured to send the vibration report 62.

The system 10 may use the vibration report 70 to generate at least one vehicle parameter 200 of the vehicle 6. The vehicle parameter 200 may include a length estimate 202, an axle count estimate 204, an axle spacing vector 206, and/or an axle width estimate 207. In certain implementations, the vehicle parameter 200 may include each of these components.

For the sake of simplifying the discussion, most of this document will focus on the vehicle parameter 200 including each of the components 202, 204, 206 and 207. This should not be interpreted as intending to limit the scope of the claims. By way of example, consider the following interpretation of the vehicle parameter 200 for the vehicle 6 shown in FIG. 1.

- The length estimate 202 may approximate the vehicle length 30.
- The axle count estimate 204 may be three, representing the count of the first axle 21, the second axle 22 and the third axle 23.
- The axle spacing vector 206 may have more than one coordinate components. For example, for a vehicle 6 including three axles 21, 22 and 23, the axle spacing vector 206 may approximate a first to second axle spacing 50, the second to third axle spacing 52. The first to second spacing 50 may approximate the spacing between the first axle 21 and the second axle 22. The second to third spacing 52 may approximate the spacing between the second axle 22 and the third axle 23. Note that the order of these components may differ from one implementation to another, and that the units may vary, from meters, to centimeters, to feet, and/or to inches in some implementations.
- The wheel base estimate 207 may approximate the axle width 24 of the vehicle 6. The units may vary, from meters, to centimeters, to feet, and/or to inches in some implementations. Alternatively, the wheel base estimate 207 may indicate one of several ranges, for instance, less than six feet, between six feet and ten feet, between 10 and 15 feet, between 15 feet and twenty feet and/or greater than twenty feet.
- The wheel base estimate 207 may be specifically used when the axle count estimate 204 indicates a vehicle with two axles to classify motor cycles, pickups, trucks and busses. In some implementations, the wheel base estimate 207 may only be occur in the vehicle parameters 200 when the axle count estimate 204 indicates two axles.

The generation of the vehicle parameters 200 will be further discussed later.

The vehicle parameters 200, in some situations, the length estimate 202, the axle count estimate 204, the axle spacing vector 206 and the wheel base estimate 207 may be used to generate a vehicle classification 220 for the vehicle 6. In this example, the vehicle classification may indicate a vehicle capable of carrying a standard size container of roughly 40 feet (thirteen meters) in length.

The system 10 may use the vibration report 70 to generate a weight estimate 210 of the vehicle 6 and/or to generate a deflection estimate 212 of the pavement 8 in response to the travel 20 of the vehicle 6 over the pavement.

- The weight estimate 210 may be in terms of different units in different implementations, for instance, units of pounds, tons, kilograms and/or metric tons are four reasonable choices that may be found in various implementations of the system 10 somewhere on the planet.
- Similarly, the deflection estimate 212 may be may be in terms of different units in different implementations.
- In some implementations, a movement estimate 22 and/or the vehicle parameters 200, 202, 204, 206 and/or 207 may be used to further support generating the weight estimate 210.
- The generation of the weight estimate 210 and/or the deflection estimate 212 will be discussed in detail later.
- The movement estimate 22 may indicate at least a velocity of the vehicle 6 and preferably also indicating its acceleration. Alternatively, the movement estimate 22 may be in terms of time to travel 20 between two of the embedded wireless vibration sensor nodes 49.

The vehicle identification 232 for the vehicle 6 may be used with the vehicle classification 220 and the weight estimate 210, as well as possibly the vehicle parameters 200-206 and the movement estimate 22 to generate a vehicle travel record 230. In some implementations, the vehicle travel record 230 may also include the vehicle classification 220, the weight estimate 210, the vehicle parameters 200-207 and/or the movement estimate 22, as well as possibly a time stamp 234. In some implementations, the vehicle travel record 230 may include a compression of some or all of these components. For instance, if the vehicle identification 232 is an image of a license plate of the vehicle 6, it may be a compressed image using some compression technology such as JPEG.

The system 10 may use the vehicle travel record 230 to generate at least one of a traffic ticket message 250, a tariff message 252 and/or an insurance message 254, each for the vehicle 6. Consider the following examples of these generated products of the process of operating the system:

- These messages 250, 252 and 254 may include much the same information, but may differ in terms of when they are generated and whom they are sent to.
- For example, the traffic ticket message 250 may indicate that the vehicle 6 with three axles 21, 22, and 23 with the approximate vehicle length 30 of 55 feet and carrying a vehicle weight 32 of approximately 120 tons has a movement estimate 22 of about 80 miles per hour with a confidence interval within 2 miles per hour. The vehicle 6 may be identified 232 by an image of its license plate and/or a Radio Frequency IDentification (RF-ID) tag.
- The traffic ticket message 250 may only be generated when the vehicle 6 is breaking a traffic regulation. The tariff message 252 may be sent for all vehicles 6 in certain vehicle classifications 220. The insurance message 254 may only be generated for vehicles 6 whose vehicle identifications 232 indicate that an insurance company has agreed to pay for the insurance message about the vehicle 6.

Several processors 100, 102, 104, 106, 108, and/or 110 may be involved in the data processing regarding these vibration reports 70 in various implementations of the system 10.

A first processor 100 may be configured to respond to the vibration readings 62 to generate the vibration report 70.

A second processor 102 may be configured to respond to the vibration report 70 to generate at least part of the vehicle parameter 200 of the vehicle 6.

A third processor 104 may be configured to respond to the vehicle parameter 200 of the vehicle 6 to generate the vehicle classification 220.

A fourth processor 106 may be configured to respond to the vibration report 70 to generate the weight estimate 210 of the vehicle weight 32 and/or the deflection estimate 212 of the deflection 31 of the pavement 8 from the vehicle 6 traveling 20 over the pavement.

A fifth processor 108 may be configured to respond to the vehicle classification 220, the weight estimate 210, the vehicle identification 232 and the vehicle movement estimate 22 to generate the vehicle travel record 230 for the vehicle 6.

And a sixth processor 110 may be configured to respond to the vehicle travel record 230 to generate at least one of the traffic ticket message 250, the tariff message 252 and the insurance message 254.

The wireless sensor network 94, the transmitter 82 and/or the transceiver 80 at the wireless sensor nodes 49 may be configured to operate in accord with a wireless communication 92 protocol, such as at least one version of an Institute for Electrical and Electronic Engineering (IEEE) 802.15.4 protocol, an IEEE 802.11 protocol, a Bluetooth protocol and/or a Bluetooth low power protocol.

The wireless sensor network 94 may use wireless communications 92 employing a modulation-demodulation scheme, that may include any combination of a frequency division multiple access scheme, a Time Division Multiple Access (TDMA) scheme, a Code Division Multiple Access (CDMA) scheme, a frequency hopping scheme, a time hopping scheme, and/or an Orthogonal Frequency Division Multiplexing (OFDM) scheme.

Figure 2A:
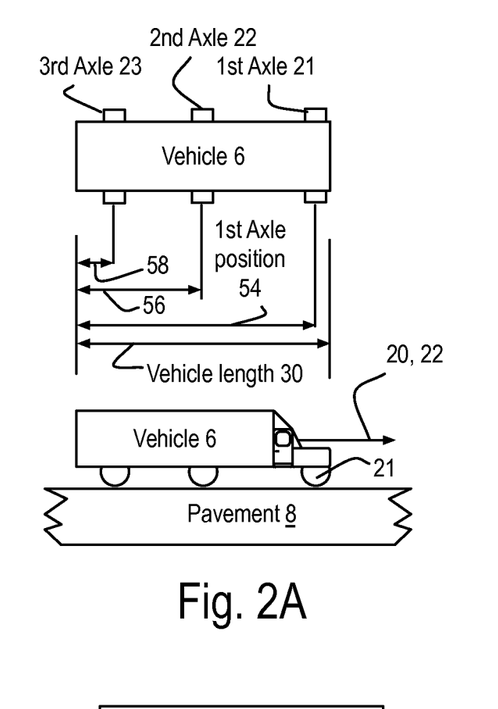
FIGS. 2A and 2B show examples of how the vehicle parameters may be alternatively defined by different implementations of the system and its components of FIG. 1.
Figure 2B:
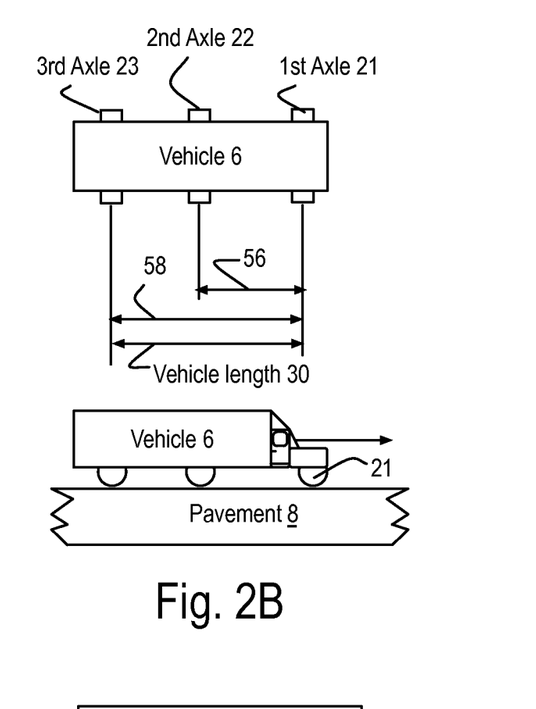

FIGS. 2A and 2B show examples of how the vehicle parameters 200 may be alternatively defined by different implementations of the system and its components of FIG. 1.

FIG. 2A shows the vehicle length 30 defined and measured as the distance between the front and the back of the vehicle 6. The first axle 21 is shown with a first axle position 54 as measured from the back of the vehicle 6. The second axle 22 is shown with a second axle position 56 measured again from the back of the vehicle 6. And the third axle 23 is shown with a third axle position 58 also measured from the back of the vehicle 6.

FIG. 2B shows the vehicle length 30 defined and measured as the distance between the first axle 21 and the last, in this case, the third axle 23.

The axle positions are measured in this example from the first axle, so the first axle position 54 is always zero, and may not be reported. The second axle position 56 is the spacing between the first axle 21 and the second axle 22. The third axle position 58 is the distance from the first axle 21 to the third axle 23, which may be seen as the sum of the first to second spacing 50 and the second to third spacing 52 of FIG. 1.

Figure 3A:
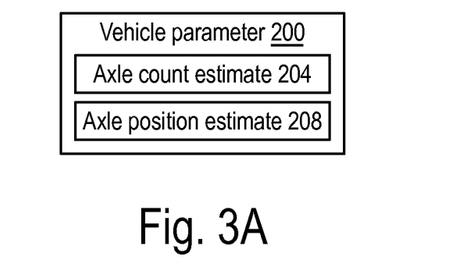
FIGS. 3A and 3B show examples of how the system and its components of FIG. 1 may implement and/or use the vehicle parameter.
Figure 3B:
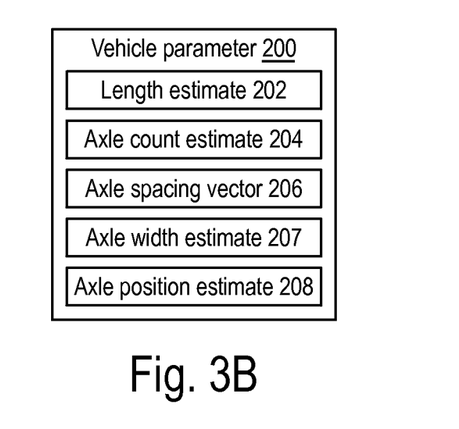

FIGS. 3A and 3B show examples of how the system 10 and its processors 100, 102, 104, 106, 108, and/or 110 of FIG. 1 may implement and/or use the vehicle parameter 200.

As used herein, the axle count estimate 204 may represent the number of axles as essentially an integer, possibly with a designator for a fifth wheel that may not be considered as a full axle.

FIG. 3A shows an example of the vehicle parameters 200 including an axle count estimate 204 and an axle position estimate vector 208, which could be based upon the definitions and measurements shown in FIG. 2A and/or FIG. 2B.

FIG. 3B shows another example of the vehicle parameters 200 including the length estimate 202, the axle count estimate 204, the axle spacing vector 206 and/or the axle position estimate vector 208.

The length estimate 202 may be based upon the definitions and measurements of the vehicle length 30 as shown in FIGS. 1 and 2B or in FIG. 2A.

The axle spacing vector 206 may represent the spacing between at least some of the adjacent axles. FIG. 1 shows the first to second spacing 50 as the distance between the first axle 21 and the second axle 22. The second to third spacing 52 as the distance between the second axle 22 and the third axle 23.

Note that in some implementations, vehicle classification may not require knowing all the spacing estimates between axles. By way of example, in the United States, when the axle count estimate 204 has a value of 5, the spacing between the third axle and the fourth axle is not used in classifying the vehicle 6, and may not be generated.

The axle position estimate 208 may be based upon the definitions and measurements shown in FIG. 2A and/or FIG. 2B.

Figure 3C:
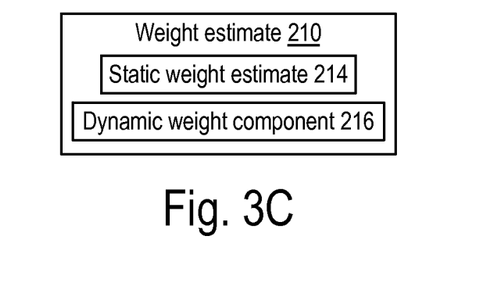
FIG. 3C shows some details of certain implementations of the weight estimate.

FIG. 3C shows some details of certain implementations of the weight estimate 210, which may contain a static weight estimate 214 and a dynamic weight component 216. The static weight estimate 214 may refer to the weight of the vehicle 6, possibly as measured for a specific axle, such as the first axle 21. The dynamic weight component 216 may refer to the force induced by the vehicle 6, possibly from the oscillation or vibration of the axles and/or the chassis of the vehicle.

Figure 4:
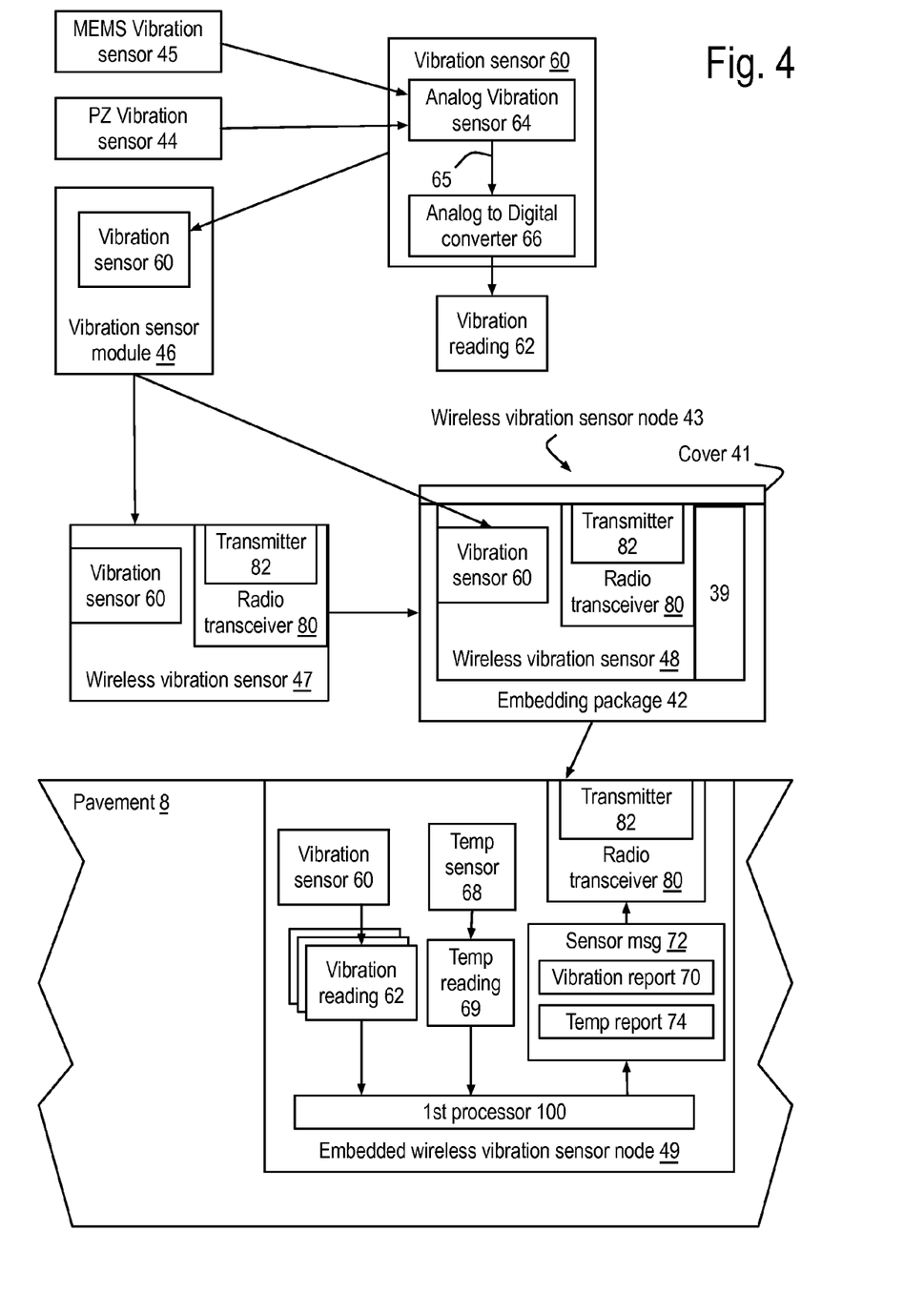
FIG. 4 shows some example implementations of components that may be used and/or included in the embedded wireless vibration sensor node embedded in the pavement shown in FIG. 1.

While there is more to discuss about how the system 10 operates, FIG. 4 will discuss how the embedded wireless vibration sensor node 49 is created in the pavement 8.

FIG. 4 shows some example implementations of components that may be used and/or included in the embedded wireless vibration sensor node 49 embedded in the pavement shown in FIG. 1.

The vibration sensor 60 may include an analog vibration sensor 64 configured to generate an analog vibration signal 65 presented to an analog to digital converter 66 that may generate the vibration reading 62 in response to the stimulus provided by the analog vibration signal.

In some embodiments the vibration reading 62 may represent a number, which may typically be in a fixed point format or a floating point numeric format.

The vibration sensor 60 may in some situations further include an amplifier to further stimulate the analog to digital converter 66.

The analog vibration sensor 64 may be implemented with a MEMS vibration sensor 45, which has also been called a MEMS accelerometer in the cited provisional patent application. As used herein, MEMS stands for Micro-Electro-Mechanical Systems.

In some embodiments, the analog vibration sensor 64 may be implemented by at least one Piezoelectric (PZ) vibration sensor 44.

Among the other components that may be included or used to create the embedded wireless vibration sensor node 49, are a vibration sensor module 46, a wireless vibration sensor 47 and/or a wireless sensor node 43.

The vibration sensor module 46 may include at least one of the vibration sensors 60 possibly coupled to a printed circuit board or insertion package configured for installation into the wireless vibration sensor 48 and/or the wireless vibration sensor node 43.

The wireless vibration sensor 47 may include the vibration sensor 60 and a radio transmitter 82 and/or a transceiver 80 configured to send the vibration report 70 based upon the vibration reading 62.

The wireless vibration sensor node 43 may be configured to be embedded in the pavement 8 and may include the vibration sensor 60 and the radio transmitter 82 and/or transceiver 80.

The wireless vibration sensor node 43 may further include the vibration sensor 60 communicatively coupled to send the vibration readings 62 to the first processor 100, which in turn may communicate the vibration report 70 to the radio transmitter 82 and/or the transceiver 80.

While not shown in the Figures, the wireless vibration sensor node 43 may further include a power controller that may use a battery to power the other active components. A photocell and/or strain gauge may be used to recharge the battery.

In some implementations, at least one of the embedded wireless vibration sensors 47, the wireless vibration sensor node 43 and/or the embedded wireless vibration sensor node 49 may include a temperature sensor 68 configured to generate a temperature reading 69. The first processor 100 may be further configured to generate and send a temperature report 74, possibly as part of a sensor message 72. More than one of the sensor messages 72 may be used to send the vibration report 70 and/or the temperature report 74.

These components may be enclosed in an embedding package 42 by a cover 41. The embedding package 42 may be filled with a packing material to minimize mechanical shock. The cover 41 may be screwed down onto the embedding package, possibly with a strip of elastomer sealant or glue to further bind the cover 41 to the embedding package 42. The embedding package 42 may approximate a cube about 3 inches on a side in some implementations.

The wireless vibration sensor node 43 may include a means for suppressing 39 acoustic noise affecting the vibration sensor 60 from the engines of the vehicles 6 passing the embedded wireless sensor node 49. The means for suppressing may includes the segment of pavement in which the wireless sensor node 43 is embedded, the fused silica packing in the wireless sensor node and/or an air-tight seal between the embedding package 42 and the cover 41.

As used herein, providing a component to create something refers to placing that component in position and then creating that something. This may use an automated or human parts assembly process.

The MEMS vibration sensor 45 and/or the Piezoelectric vibration sensor may be provided to create the vibration sensor 60.

The vibration sensor 60 may be provided to create the vibration sensor module 46, the wireless vibration sensor 47, the wireless vibration sensor node 43 and/or the embedded wireless vibrations sensor node 49.

The vibration sensor module 46 may be provided to create the wireless vibration sensor 47, the wireless vibration sensor node 43 and/or the embedded wireless vibrations sensor node 49.

The wireless vibration sensor 47 may be provided to create the wireless vibration sensor node 43 and/or the embedded wireless vibrations sensor node 49.

And the wireless vibration sensor node 43 may be provided into a cavity in the pavement 8 to create the embedded wireless vibrations sensor node 49. The wireless vibration sensor node 43 may be placed into a four inch hole drilled into the pavement 8 that is then filled with epoxy to create the embedded wireless vibrations sensor node 49. Installation of the embedded wireless vibration sensor node may take under ten minutes.

In some implementations, the embedded wireless vibration sensor node may implement some of the processors.

Figure 5:
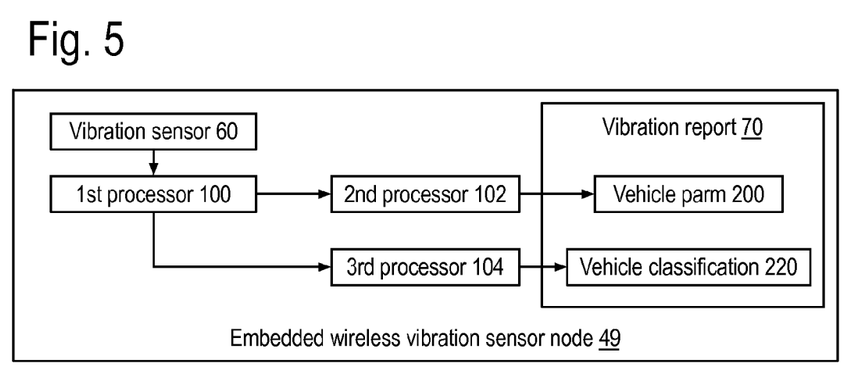
FIG. 5 shows an example of the embedded wireless vibration sensor node further including the second processor and the fourth processor, with the vibration report further indicating the vehicle parameter and the vehicle classification.

FIG. 5 shows an example of the embedded wireless vibration sensor node 49 further including the second processor 102 and the third processor 104, with the vibration report 70 further indicating the vehicle parameter 200 and the vehicle classification 220.

Figure 6:
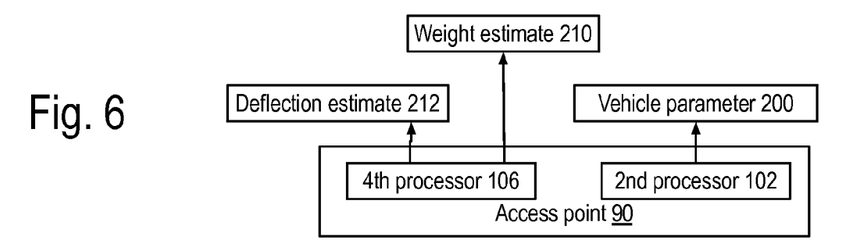
FIGS. 6 and 7 show examples of various combinations of the second through the sixth processor may be implemented in the access point.
Figure 7:
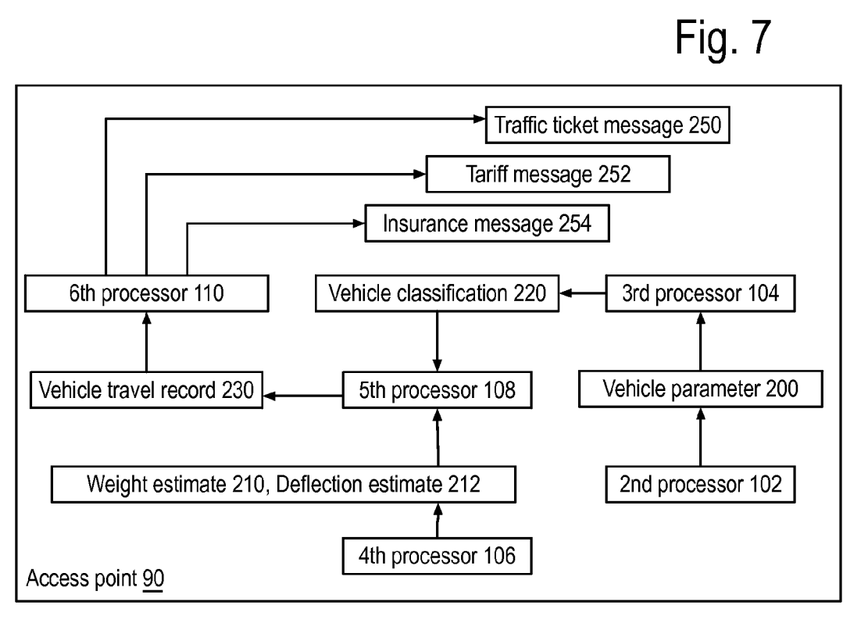

FIGS. 6 and 7 show examples of various combinations of the second through the sixth processor 102 to 110 may be implemented in the access point 90.

FIG. 6 shows the access point 90 may include the second processor 102 and the fourth processor 106.

FIG. 7 shows the access point 90 may further include the third processor 104, the fifth processor 108 and the sixth processor 110.

The wireless sensor network 94 may also include wireless sensor nodes 96 operating a magnetic sensor 97, an optical sensor, a digital camera, and/or a radar.

Figure 8A:
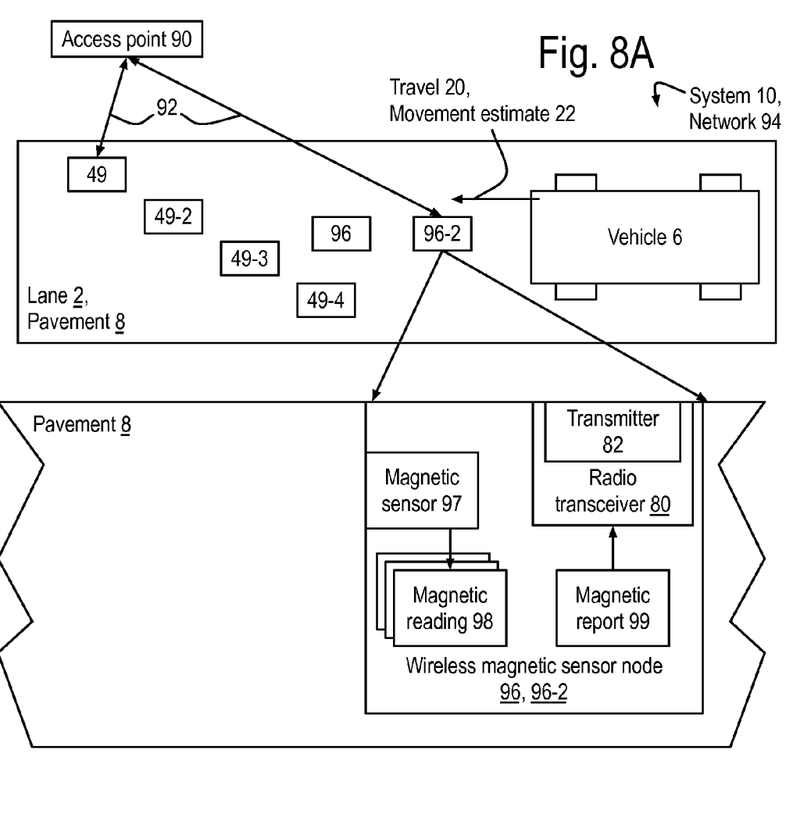
FIG. 8A shows an example of the system of FIG. 1 further including more than one instances of the embedded wireless vibration sensor nodes embedded in the pavement of a lane of a roadway. The system may further include one or more wireless magnetic sensor node also embedded in the pavement.
Figure 8B:
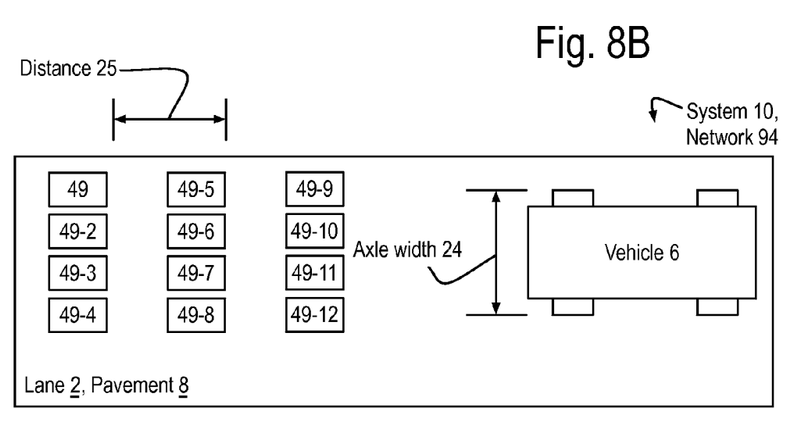
FIGS. 8B and 8C show some other examples of the system of FIGS. 1 and 8A that may also determine the axle width for a vehicle with two axles, as well as possibly further include radar, infrared sensors and/or optical sensors. The system may also include a temperature sensor that may or may not be implemented in the embedded wireless vibration sensor nodes.
Figure 8C:
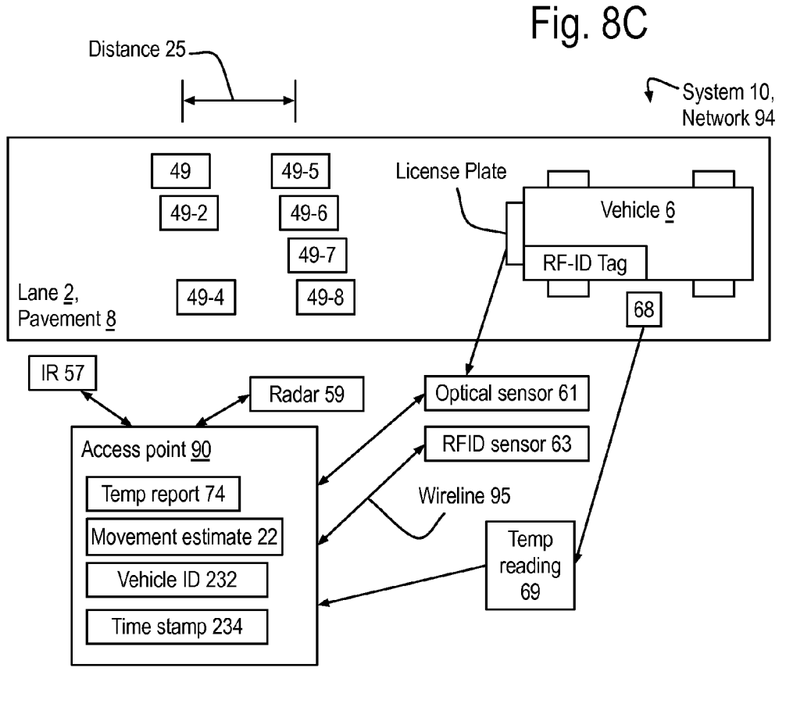

FIG. 8A to 8C show examples of some of the details of the system 10 of FIG. 1.

FIG. 8A shows an example of the system 10 of FIG. 1 further including more than one, in this case four instances of the embedded wireless vibration sensor nodes 49 to 49-4 embedded in the pavement 8 of a lane 2 of a roadway. The system 10 may further include one or more, in this case two instances, of a wireless magnetic sensor node 96 and 96-2 embedded in the pavement 8 of the lane 2. The system 10 may be configured to use the wireless magnetic sensor nodes 96 and 96-2 to generate the movement estimate 22 of the vehicle 6 traveling 20 in the lane 2. In some embodiments, the wireless magnetic sensor nodes 96 and 96-2 may be used to generate and/or refine the length estimate 202.

The wireless magnetic sensor node 96 may include a magnetic sensor 97 configured to generate magnetic readings 98 as the vehicle 6 travels 20 close to the node 96. These magnetic readings 98 may be used to generate a magnetic report 99 that may be sent by the transmitter 82 to the access point 90 for use in generating the movement estimate 22 and/or the length estimate 202.

FIG. 8B shows another example of the system of FIGS. 1 and 8A that may also determine the axle width 24 for a vehicle 6 with two axles. This example of the system 10 includes three columns of the wireless vibration sensor nodes configured with a distance 25 between the columns. The first column may include the wireless vibrations sensor nodes 49 to 49-4. The second column may include the wireless vibration sensor nodes 49-5 to 49-8. The third column may include the wireless vibration sensor nodes 49-9 to 49-12.

The distance 25 may be measured in different fashions, such as from one edge as shown in FIG. 8B, or from the centers as shown in FIG. 8C.

The columns may have the same number of wireless vibration sensor nodes as shown in FIG. 8B or may have different numbers of wireless vibration sensor nodes as shown in FIG. 8C.

In some embodiments, more than two columns may be useful in fourth processing 106 the vibration readings 62 and/or the vibration reports 70 to generate the weight estimate 210. Consider the following example implementations:

The static weight estimate 214 may be generated by removing the dynamic weight component 216 from the weight estimate 210. This removal may be performed by averaging the weight estimates based upon each of the columns of embedded wireless vibration sensor nodes 49 and so on. Other signal processing steps may be used to remove the dynamic weight component 216 from the weight estimate 210. This may be preferred when the distance 25 between the columns is at least about twelve feet or at least about four meters. Such implementations of the system 10 may use the weight estimate 210 as the static weight estimate 214 after the dynamic weight component 216 has been removed.

The dynamic weight component 216 may be recognized in the weight estimate 210 thereby revealing the static weight estimate 214, which may be calculated later. The system 10 may be implemented to use the weight estimate 210 with the recognized dynamic weight component 216.

Note that in some implementations of the system 10, combinations of these last two examples may be found.

FIG. 8C shows another example of the system 10 of FIGS. 1 and 8A that may further include a radar 59, an infrared sensor 57 and/or optical sensors 61. The system 10 may also include a temperature sensor 68 that may not be implemented in the embedded wireless vibration sensor nodes 49. The distance 25 may be measured from the centers. The columns may have different numbers of wireless vibration sensor nodes. For example, the first column may include three wireless vibration sensor nodes 49, 49-2 and 49-4, whereas the second column may include four wireless vibration sensor nodes 49-5 to 49-8. The columns may not be arranged perpendicular to the travel 20 of the vehicle 6, as shown in this Figure.

The radar 59 may be used to at least partly determine the movement estimate 22. In other embodiments, the movement estimate 22 may be at least partly determined by the columns of wireless vibration sensors 49 to 49-8 and the distance 25 between the columns. The infrared sensor 57 may also be used to at least partly determine the movement estimate 232.

The Radio Frequency Identification (RF-ID) sensor 63 may be configured to respond to a RF-ID tag to at least partly generate the vehicle identification 232. For example, an insurance carrier may require the installation of the RF-ID tag so that the vehicles 6 it insures may be tracked.

An optical sensor 61 may respond to a license plate on the vehicle 6 to at least partly generate the vehicle identification 232.

The access point 90 may be configured to communicate with any combination of the infrared sensor 57, the radar 59, the optical sensor 61, the RF ID sensor 63 and/or the temperature sensor 68, either through the use of a wireless communication 94 as previously discussed or a wireline communication 95. As used herein, a wireline communication 95 uses at least one wireline physical transport. Examples of wireline physical transports include, but are not limited to, one or more conductive wires and/or fiber optical conduits.

The access point 90 may use an internal clock and/or an external clock to generate a time stamp 234.

Figure 9:
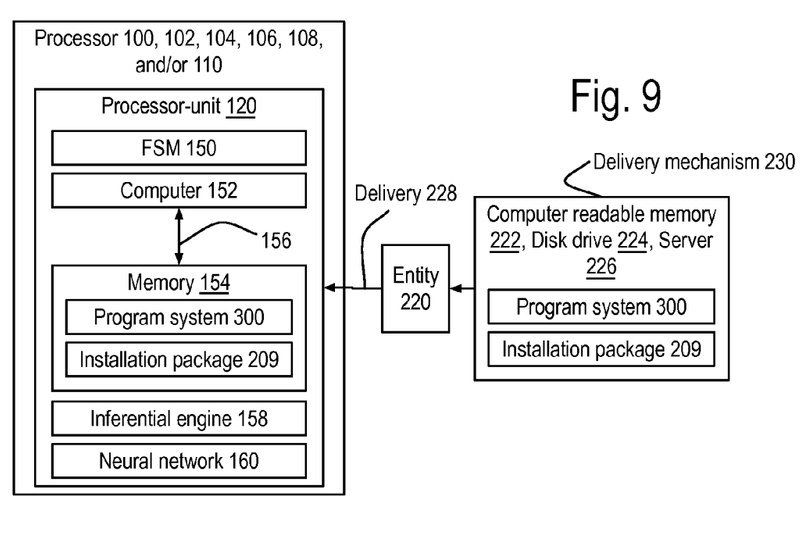
FIG. 9 shows the processors may be individually and/or collectively may be implemented as one or more instances of a processor-unit. The apparatus may further include delivery mechanisms that may be controlled by an entity directing and/or benefiting from the delivery to the processor-unit of the program system and/or an installation package to implement at least part of the disclosed method and/or apparatus.

FIG. 9 shows the processors 100 to 110 may be individually and/or collectively may be implemented as one or more instances of a processor-unit 120 that may include a finite state machine 150, a computer 152 coupled 156 to a memory 154 containing a program system 300, an inferential engine 158 and/or a neural network 160. The apparatus may further include examples of a delivery mechanism 230, which may include a computer readable memory 222, a disk drive 224 and/or a server 226, each configured to deliver 228 the program system 300 and/or an installation package 209 to the processor-unit 120 to implement at least part of the disclosed method and/or apparatus. These delivery mechanisms 230 may be controlled by an entity 220 directing and/or benefiting from the delivery 228 to the processor-unit 120, irrespective of where the server 226 may be located, or the computer readable memory 222 or disk drive 224 was written.

As used herein, the Finite State Machine (FSM) 150 receives at least one input signal, maintains at least one state and generates at least one output signal based upon the value of at least one of the input signals and/or at least one of the states.

As used herein, the computer 152 includes at least one instruction processor and at least one data processor with each of the data processors instructed by at least one of the instruction processors. At least one of the instruction processors responds to the program steps of the program system 300 residing in the memory 154.

As used herein, the Inferential Engine 158 includes at least one inferential rule and maintains at least one fact based upon at least one inference derived from at least one of the inference rules and factual stimulus and generates at least one output based upon the facts.

As used herein, the neural network 160 maintains at list of synapses, each with at least one synaptic state and a list of neural connections between the synapses. The neural network 160 may respond to stimulus of one or more of the synapses by transfers through the neural connections that in turn may alter the synaptic states of some of the synapses.

Figure 10:
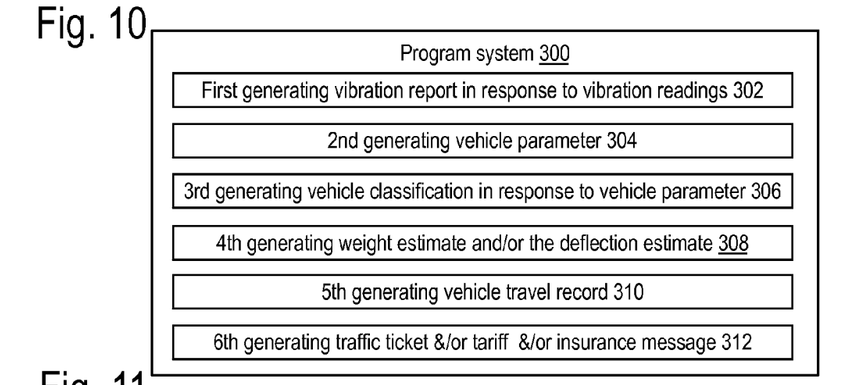
FIGS. 10 to 14 show some details of the program system of FIG. 9 that may serve as examples for at least some of the steps of the disclosed method.

FIG. 10 shows some details of the program system 300 of FIG. 9 that may include one or more of the following program steps:

Program step 302 supports first-generating the vibration report 70 in response to the vibration readings 62.

Program step 304 supports second-generating at least part of the vehicle parameters 200-208 of the vehicle 6 in response to the vibration readings 62 and/or the vibration report 70.

Program step 306 supports third-generating the vehicle classification 220 of the vehicle 6 in response to one or more of the vehicle parameters 200-208.

Program step 308 supports fourth-generating the weight estimate 210 and/or the deflection estimate 212 in response to the vibration readings 62 and/or the vibration report 70.

Program step 310 supports fifth-generating the vehicle travel record 230 for the vehicle 6 in response to the vehicle classification 220, the weight estimate 210, the deflection estimate 212, the vehicle identification 232 and/or the vehicle movement estimate 22.

Program step 312 supports sixth-generating the at least one of the traffic ticket message 250, the tariff message 252 and/or the insurance message 254, each for the vehicle 6 in response to the vehicle travel record 230.

Let ζ={t→z(t), t ∈ (t0, t1)} denote a succession of measurement samples of the vibration 34 as reported by the vibration sensor 60. The vibration sensor 60 may report these vibrations 34 as a sequence of vibration readings 62 arranged in time t.

Figure 11:
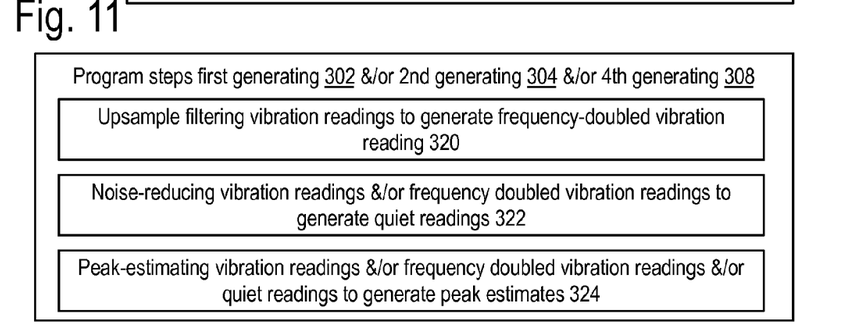

FIG. 11 shows some details of the program steps 302, 304, and/or 308 of FIG. 10 that may include one or more of the following program steps:

Program step 320 supports upsample filtering at least two of the vibration readings 62 to generate at least one frequency-doubled vibration reading. As used herein, an upsample filter generates more samples output than sample inputs. In some contexts, the upsample filter may be decomposed into upsampling and a second filtering at least part of the upsampled data stream to emulate increasing the sampling frequency without having to operate the sensor more often.

Up-sampling may be implemented in a variety of ways. For example, each input sample may be replicated one or more times. Another example, each input sample may have a fixed value, such as zero inserted between it and the next input sample. Another example, the input sample may be inserted between a running and/or windowed average of the input stream.

The second filter may be composed of two or more subband filters whose outputs are sub-sampled so that the output rate of the second filter may be the same the up-sampled input stream rate, which may then be twice or more times the input stream rate of the upsampled filter.

Program step 322 supports noise-reducing the vibration readings 34 and/or the frequency-doubled reading to generate at least two quiet-vibration readings. In some implementations, noise-reducing processes the sensor measurement sample ζ to remove frequencies above min {6, 2.47 v} Hz and frequencies below 0.1 Hz. These or similar cutoffs may be arrived at empirically.

Program step 324 supports peak-estimating the vibration readings 34 and/or the frequency-doubled reading and/or the quiet-vibration readings to generate at least one peak estimate. This program step may take a moving average of measurements to estimate the magnitude and time at which the pavement 8's vibration 34 achieves a negative and positive (local) peak, often referred to as a local extrema.

In some implementations, all measurements may filtered by the noise-reducing step before being processed by such program steps as up-filtering, peak-estimating and so on.

Figure 12:
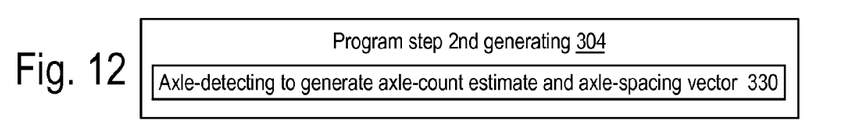

FIG. 12 shows an example of some details of the program steps 304 second generating the vehicle parameter 200 of FIG. 10 that may include the following program step:

Program step 330 supports axle-detecting to generate the axle count estimate 204 and the axle-spacing vector 206. This program step may take the results of the peak-estimating program step 324, partition the sample into different segments to isolate the response of individual vehicles 6, and, if there is more than one embedded vibration sensors 49, takes the maximum of the signals from different sensors to boost the signal-to-noise ratio. It may identify the occurrence of a negative or positive peak with an individual axle to generate the axle count estimate 204 in each vehicle 6, and knowing the movement estimate 22 gives the spacing between axles as the axle spacing vector 206.

Figure 13:
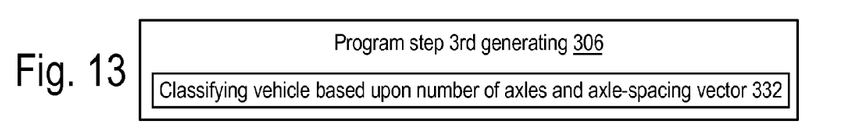

FIG. 13 shows an example of some details of the program step 306 third generating the vehicle classification 220 of FIG. 10 that may include the following program step: Program step 332 supports classifying the vehicle 6 based upon the axle count estimate 204 and the axle-spacing vector 206 to generate the vehicle classification 220.

This program step 332 may classify vehicles 6 in accord with the FHWA classification scheme in the United States.

Other examples of the details of the program step 306 may classify vehicles 6 in accord with a different nation's, state's and/or province's standard classification scheme.

Figure 14:
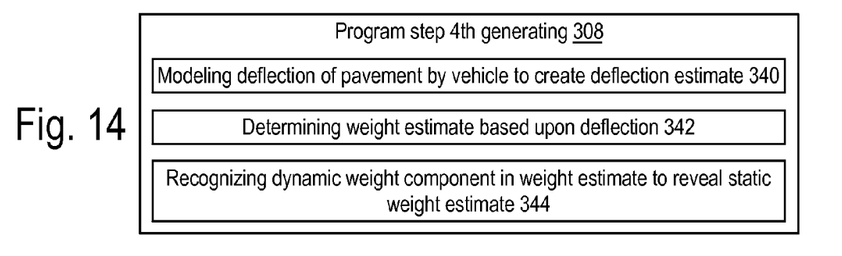

FIG. 14 shows some details of the program steps 308 fourth generating the weight estimate 210 and/or the deflection estimate 212 of FIG. 10 that may include the following program steps:

Program step 340 supports modeling a deflection 31 of the pavement 8 by the vehicle 6 to create the deflection estimate 212.

Program step 342 supports determining the weight estimate 210 based upon the deflection 31 of the pavement 8, for instance, based upon the deflection estimate 212.

Program step 344 supports recognizing the dynamic weight component 216 in the weight estimate 210 to reveal the static weight estimate 214. Note that in some embodiments, an averaging of the weight estimates 210 from multiple columns of the embedded wireless vibration sensor nodes 49 as shown in FIG. 8B may further generate the static weight estimate 214. Also note, that determining the dynamic weight component 216 may be performed and the weight estimate 210 combined with the dynamic weight component 216 may be used by the system 10 to reveal the static weight estimate 214.

Consider the following model of the deflection 31 of the pavement 8: Assume the pavement 8 is an Euler beam. The deflection 31 is denoted by y(x, t) at position x and time t in response to a load on a single axle, say one of 21, 22 or 23 of FIG. 1. The deflection 31 may approximated as $$y(x,t) = F\gamma^{-1} Re[\Psi^*(vt-x)e^{i\omega_0 t}] \quad (1)$$

Here F may denote the axle load, $\omega_0$ may denote the fundamental frequency of the axle suspension system, v may denote the vehicle speed, γ may denote a constant, and the pavement response $\psi^*$ may have a functional form as a complex function of position and time; both γ and $\psi^*$ depend upon parameters of the pavement 8 such as stiffness. The signal 34 measured by the vibration sensor 60 placed at x may be approximated as $$z(t) = \eta \times \frac{\partial^2 y}{\partial t^2}(x, t) + w(t) \quad (2)$$

Consider some of the signal processing aspects of the system 10 and its processors 100-110 in which η is a constant, w is measurement noise originating in the electronic circuitry of the wireless vibration sensor node 49 and random pavement 8 vibrations 34. Differentiating (1) twice shows that in this model acceleration is linear in axle load F and $v^2$. The displacement of a real pavement 8 may not follow the ideal model, however the acceleration (and displacement) may often increase monotonically with the load F and speed v. Also, the greater the vehicle speed v, the higher will be the frequencies in the signal.

The disclosed method may include steps initializing at least one of the apparatus 10, 100-110, 49 and/or 90, and/or operating at least one of the apparatus and/or using at least one of the apparatus to create at least one of the vibration report 70, the vehicle parameter 200-208, the weight estimate 210, the deflection estimate 212, the vehicle classification 220, the vehicle travel record 230, the traffic ticket message 250, the tariff message 252, and/or the insurance message 254, each for the vehicle 6. The vibration report 70, the vehicle parameter 200-208, the weight estimate 210, the deflection estimate 212, the vehicle classification 220, the vehicle travel record 230, the traffic ticket message 250, the tariff message 252, and/or the insurance message 254 are produced by various steps of the method.

Modeling the deflection 31 of the pavement 8 may integrate twice the noise-reduced response for each axle 21, 22, and/or 23 to create the deflection estimate 212. The peak deflection and speed can be used in a lookup table to estimate axle load, which may represent the weight estimate 210. The table may be built using calibrated vehicles 6.

The inventors have performed field tests using a system 10 similar to the system 10 shown in FIG. 8. Test results from three different sites indicate that the measurements are repeatable, and the system 10 correctly detects axles, and estimates pavement deflection 31 accurately and axle load well. The system 10 directly measures deflection 31 of the pavement 8 as the vehicle 6 goes over it, unlike current WIM stations that measure deflection of a plate, isolated from the pavement. The system 10 can be installed in minutes and takes up no space in or next to the lane 2. It may be used in settings where current WIM stations are inappropriate, including weighing vehicles 6 on urban streets, and a vehicle weight-based tolling system.

The preceding discussion serves to provide examples of the embodiments and is not meant to constrain the scope of the following claims.

The invention claimed is:

1. An apparatus, comprising at least one of
a first processor configured to respond to said vibration readings created by at least one vibration sensor configured to respond to vibrations in pavement induced by travel of a vehicle to generate said vibration report;
a second processor configured to respond to said vibration report to generate at least one vehicle parameter of said vehicle; wherein said vehicle parameter includes at least one of a length estimate, an axle count estimate, an axle position estimate vector, an axle spacing vector and an axle width estimate;
a third processor configured to respond to said vehicle parameter of said vehicle from said second processor to generate a vehicle classification of said vehicle;
a fourth processor configured to respond to said vibration report from said first processor to generate a weight estimate of said vehicle and/or a deflection estimate of said vehicle deflecting said pavement;
a fifth processor configured to respond to said vehicle classification from said third processor, a vehicle identification, a vehicle movement estimate and at least one of said weight estimate and said deflection estimate from said fourth processor to generate a vehicle travel record for said vehicle; and
a sixth processor configured to respond to said vehicle travel record from said fifth processor to generate at least one of a traffic ticket message, a tariff message and an insurance message, each for said vehicle.

2. The apparatus of claim 1, further comprising:
an embedded wireless vibration sensor node including at least one of said vibration sensor configured to provide said vibration readings;
said first processor configured to respond to said vibration readings to generate said vibration report; and
a radio transmitter configured to respond to transmit said vibration report.

3. The apparatus of claim 2, further comprising
an access point configured to wirelessly communicate with at least one of said embedded wireless vibration sensor node to receive said vibration report.

4. The apparatus of claim 3, wherein said access point includes at least one of said second processor, said third processor, said fourth processor, said fifth processor and/or said sixth processor.

5. The apparatus of claim 3, wherein at least one of said first processor, said second processor, said third processor, said fourth processor, said fifth processor and/or said sixth processor includes at least one instance of a processor-unit;
wherein said processor-unit includes at least one of a finite state machine, a computer accessibly coupled to memory containing a program system, an inferential engine and a neural network.

6. The apparatus of claim 5, wherein said program system include at least one of the program steps of
first-generating said vibration report in response to said vibration readings;
second-generating said vehicle parameter of said vehicle in response to said vibration readings and/or said vibration report;
third-generating said vehicle classification of said vehicle in response to said vehicle parameter;
fourth-generating said weight estimate and/or said deflection estimate in response to said vibration readings and/or said vibration report;
fifth-generating said vehicle travel record for said vehicle in response to said vehicle classification, said weight estimate, said deflection estimate, said vehicle identification and/or said vehicle movement estimate; and
sixth-generating said at least one of said traffic ticket message, said tariff message and/or said insurance message, each for said vehicle in response to said vehicle travel record.

7. The apparatus of claim 6,
wherein at least one of the program steps of first-generating said vibration report and/or second-generating and/or fourth generating further comprises at least one of the program steps of
up-filtering at least two of said vibration readings to generate at least one frequency-doubled vibration reading;
noise-reducing said vibration readings and/or said frequency-doubled reading to generate at least two quiet-vibration readings; and
peak-estimating said vibration readings and/or said frequency-doubled reading and/or said quiet-vibration readings to generate at least one peak estimate;
wherein the program step of second-generating said vehicle parameter of said vehicle further comprises the program step of axle-detecting to generate a number-of-axles and an axle-position vector for said vehicle;
wherein the program step of third-generating said vehicle classification of said vehicle in response to said vehicle parameter of said vehicle further comprises the program step of
classifying said vehicle based upon said number-of-axles and said axle-position vector;
wherein the program step of fourth-generating said weight estimate of said vehicle in response to said vibration report further comprises the program steps of
modeling a deflection of said vehicle;

determining said weight estimate based upon said deflection of said vehicle on said pavement; and recognizing a dynamical weight component in said weight estimate to reveal a static weight estimate.

8. The apparatus of claim 5, further comprising at least one of a computer readable memory, a disk drive, and a server, each configured to deliver said program system and/or an installation package to said processor-unit, with said installation package configured to instruct said processor-unit to install at least part of said program system into at least one of said first processor through said sixth processor.

9. A method comprising at least one of the steps of:
initializing at least one of said apparatus of claim 8;
operating at least one of said apparatus; and
using at least one of said apparatus to create at least one of said vibration report, said vehicle parameter, said vehicle classification, said vehicle travel record, said traffic ticket message, said tariff message and/or said insurance message, each for said vehicle.

10. The method of claim 9, wherein the step of initializing further comprises at least one of the steps of:
providing at least one of said vibration sensor, said vibration sensor module and/or said wireless vibration sensor node to implement said embedded wireless vibration sensor node embedded in said pavement;
calibrating said embedded wireless vibration sensor node for use with said access point to deliver said vibration report to said access point;
configuring at least one of said first processor, said second processor, said third processor, said fourth processor, said fifth processor and/or said sixth processor; and
delivering said installation package and/or said program system to said processor-unit.

11. The method of claim 9, wherein the step of operating further comprises at least one of the steps of:
first-generating said vibration report in response to said vibration readings;
second-generating said vehicle parameter of said vehicle in response to said vibration report;
third-generating said vehicle classification of said vehicle and/or a deflection estimate in response to said vehicle parameter of said vehicle;
fourth-generating said weight estimate of said vehicle in response to said vibration report;
fifth-generating said vehicle travel record for said vehicle in response to said vehicle classification, said weight estimate, said vehicle identification and said vehicle movement estimate for said vehicle; and
sixth-generating said at least one of said traffic ticket message, said tariff message and/or said insurance message, each for said vehicle in response to said vehicle travel record.

12. The method of claim 9, wherein the step of using further comprises at least one of the steps of:
fifth-generating said vehicle travel record for said vehicle in response to said vehicle classification, said weight estimate, said vehicle identification and said vehicle movement estimate for said vehicle; and
sixth-generating said at least one of said traffic ticket message, said tariff message and/or said insurance message, each for said vehicle in response to said vehicle travel record.

13. At least one of said weight estimate, said deflection estimate, said vibration report, said vehicle parameter, said vehicle classification, said vehicle travel record, said traffic ticket message, said tariff message and/or said insurance message, each for said vehicle, and/or said installation package and/or said program system as a product of the process of claim 11.

14. The apparatus of claim 1, wherein said pavement includes a filler and a bonding agent.

15. The apparatus of claim 14, wherein said filler includes at least one of sand, gravel, and pumice; and
wherein said bonding agent includes at least one of an asphalt and a cement.

16. The apparatus of claim 2, further comprising a component apparatus adapted to at least partly make said embedded wireless vibration sensor node, further comprising at least one of
a vibration sensor module including at least one of said vibration sensor configured to respond to said vibrations in said pavement to create said at least one vibration reading;
a wireless vibration sensor including said vibration sensor and said radio transmitter; and
a wireless vibration sensor node configured to be embedded in said pavement and including said vibration sensor and said radio.

* * * * *